US008046689B2

(12) United States Patent
Naik et al.

(10) Patent No.: US 8,046,689 B2
(45) Date of Patent: Oct. 25, 2011

(54) MEDIA PRESENTATION WITH SUPPLEMENTARY MEDIA

(75) Inventors: Devang K. Naik, San Jose, CA (US); Kim Ernest Alexander Silverman, Mountain View, CA (US); Guy L. Tribble, Hillsborough, CA (US)

(73) Assignee: Apple Inc., Cupertino, CA (US)

( * ) Notice: Subject to any disclaimer, the term of this patent is extended or adjusted under 35 U.S.C. 154(b) by 246 days.

(21) Appl. No.: 11/369,480

(22) Filed: Mar. 6, 2006

(65) Prior Publication Data

US 2006/0168150 A1    Jul. 27, 2006

Related U.S. Application Data

(60) Provisional application No. 60/756,423, filed on Jan. 4, 2006.

(51) Int. Cl.
*G06F 3/16* (2006.01)
(52) U.S. Cl. ......................... 715/727; 715/716
(58) Field of Classification Search .................. 715/716, 715/730–732, 727
See application file for complete search history.

(56) References Cited

U.S. PATENT DOCUMENTS

| 5,204,969 A * | 4/1993 | Capps et al. ................. 704/278 |
| 5,212,733 A * | 5/1993 | DeVitt et al. ................. 381/119 |
| 5,953,710 A | 9/1999 | Fleming |
| 6,978,116 B2 * | 12/2005 | Burr et al. ..................... 455/3.02 |
| 7,324,166 B1 * | 1/2008 | Joslin et al. .................... 348/722 |
| 2001/0034703 A1 | 10/2001 | Picciallo et al. |
| 2002/0095386 A1 | 7/2002 | Maritzen et al. |
| 2002/0154155 A1 * | 10/2002 | McKirchy ..................... 345/705 |
| 2003/0001881 A1 * | 1/2003 | Mannheimer et al. ........ 345/728 |
| 2003/0158737 A1 * | 8/2003 | Csicsatka ..................... 704/273 |
| 2004/0268451 A1 | 12/2004 | Robbin et al. |
| 2005/0015254 A1 | 1/2005 | Beaman et al. |
| 2005/0021478 A1 | 1/2005 | Gautier et al. |
| 2005/0050345 A1 | 3/2005 | Dowdy et al. |
| 2006/0031770 A1 * | 2/2006 | McMenamin ................ 715/741 |
| 2006/0095848 A1 | 5/2006 | Naik et al. |
| 2006/0149681 A1 * | 7/2006 | Meisner ......................... 705/52 |
| 2007/0198925 A1 * | 8/2007 | He et al. ........................ 715/530 |

FOREIGN PATENT DOCUMENTS

| EP | 0725376 A2 | 8/1996 |
| EP | 1111562 A2 | 6/2001 |
| WO | WO 00/28461 | 5/2000 |
| WO | WO 00/43852 | 7/2000 |

(Continued)

OTHER PUBLICATIONS

Business Wire, "DiscJockey.com Launches 'Play Our Song', An Interactive Valentine's Day Campaign", findarticles.com/p/articles/mi_m0EIN/is_2000_Feb_10/ai_59316769/print (Feb. 10, 2000).*

(Continued)

*Primary Examiner* — Ashraf Zahr

(57) ABSTRACT

Improved techniques for providing supplementary media for media items are disclosed. The media items are typically fixed media items. The supplementary media is one or more of audio, video, image, or text that is provided by a user to supplement (e.g., personalize, customize, annotate, etc.) the fixed media items. In one embodiment, the supplementary media can be provided by user interaction with an on-line media store where media items can be browsed, searched, purchased and/or acquired via a computer network. In another embodiment, the supplementary media can be generated on a playback device.

45 Claims, 12 Drawing Sheets

FOREIGN PATENT DOCUMENTS

| WO | WO 01/50305 A2 | 7/2001 |
| WO | WO 02/08869 A2 | 1/2002 |

OTHER PUBLICATIONS

"The iTunes Music Store. Downloads Done Right", www.apple.com/music/store, downloaded Sep. 24, 2003, pp. 1-3.

"Shop the First Online 99¢ Store", www.apple.com/music/store/shop.html, downloaded Sep. 24, 2003, pp. 1-2.

Bhatnagar, "Gift Cards: Charged for the Holidays", CNNMoney, Oct. 29, 2003, pp. 1-3.

Communication pursuant to Article 96(2) for EP Application No. 04252425.6 dated Jun. 27, 2006.

* cited by examiner

MEDIA PRESENTATION WITH SUPPLEMENTARY MEDIA

CROSS-REFERENCE TO RELATED APPLICATIONS

This application claims priority of U.S. Provisional Patent Application No. 60/756,423, filed Jan. 4, 2006, and entitled "MEDIA PRESENTATION WITH SUPPLEMENTARY MEDIA," which is hereby incorporated herein by reference.

This application is related to U.S. application Ser. No. 10/981,993, filed Nov. 4, 2004, and entitled "AUDIO USER INTERFACE FOR COMPUTING DEVICES," which is hereby incorporated herein by reference.

This application is also related to U.S. application Ser. No. 10/623,339, filed Jul. 18, 2003, and entitled "VOICE MENU SYSTEM," which is hereby incorporated herein by reference.

BACKGROUND OF THE INVENTION

Today, portable media devices, such as Personal Digital Assistants (PDAs) or hand-held music players, are battery powered and include various user interface components. Conventionally, portable media devices use buttons, dials or touchpads together with graphical user interfaces to control the media devices, including navigating through media items resident on (or accessible to) the media devices, selecting media items to be played, and/or setting user preferences for use by the media devices. These portable media devices continue to get smaller and more portable. At the same time, the functionality supported by portable media devices is increasing. Consequently, as portable media devices get smaller while supporting robust functionality, there are increasing difficulties in providing adequate user interfaces for the portable media devices.

In order to achieve portability, many portable music players use minimalist displays that allow user access to the music via simple graphical user interfaces. The displays are not always well-lit, and may not be navigable in the dark, and furthermore illuminating the displays is a drain on battery power. Also, the user may be in certain situations (e.g., driving a car) where it is not convenient or appropriate to look at the display, or may have a physical disability that makes visual navigation impossible. Additionally, many people may simply find the displays too small and inconvenient to use on a regular basis. Recently, portable music players have been made highly portable and may not even include a display for presenting a graphical user interface. Hence, it has become important for portable music players to provide user-friendly interfaces that enable user interaction without reliance on graphical user interfaces.

In addition, while it is common to download media items, such as audio files (e.g., music), to personal media players, the media items being downloaded are fixed. Unlike radio stations, personal media players do not operate to allow mixing of additional audio while playing audio from the audio files.

Accordingly, there are continuing efforts to further improve the user experience with respect to media players.

SUMMARY OF THE INVENTION

The invention relates to improved techniques for providing supplementary media for media items. The media items are typically fixed media items. The supplementary media is one or more of audio, video (including animation), image (e.g., photo), or text that is provided by a user to supplement (e.g., personalize, customize, annotate, etc.) the fixed media items. In one embodiment, the supplementary media can be provided by user interaction with an on-line media store where media items can be browsed, searched, purchased and/or acquired via a computer network. In another embodiment, the supplementary media can be generated on a playback device.

The supplementary media can be used for various different purposes, such as an annotation to the associated media item, a personal message to the recipient of the associated media item, or a comment or feedback on the associated media item. The supplementary media can also be considered a media monogram. The media monogram can, for example, be provided by a gift giver, artist, publisher, or annotator. The invention can be implemented in numerous ways, including as a method, system, device, apparatus, or computer readable medium. Several embodiments of the invention are discussed below.

As a method for outputting media data to be played on a media output device, one embodiment of the invention includes at least the acts of: identifying media data for a media item to be played; determining whether supplementary media data is associated with the media item; and concurrently outputting the identified media data together with the supplementary media data to the media output device.

As a method for outputting audio data to be played on a media output device, one embodiment of the invention includes at least the acts of: identifying audio data for a media item to be played; determining whether supplementary audio data is associated with the media item; accessing the supplementary audio data associated with the media item when it is determined that supplementary audio data is associated with the media item; mixing the supplementary audio data with the identified audio data; and outputting the mixed audio data to the media output device.

As a method for associating a media message to a media item, one embodiment of the invention includes at least the acts of: identifying a media item of interest; determining whether a media message is to be associated with the media item; and associating the media message with the media item.

As a method for associating personal audio messages to media items, one embodiment of the invention includes at least the acts of: receiving a request by a user to purchase a gift certificate pertaining to gifting media items; prompting the user to enter a personal audio message to be associated with the gift certificate; completing purchase of the gift certificate, the purchased gift certificate having the personal audio message associated therewith; subsequently purchasing a media item using the gift certificate; and associating the personal audio message that is associated with the gift certificate with the media item being purchased.

As a method for associating personal media messages to media items, one embodiment of the invention includes at least the acts of: receiving a request by a user to acquire a media item; receiving a media message to be associated with the media item being acquired; associating the media message with the media item being acquired; completing acquisition of the media item; and forwarding the acquired media item with the associated media message to the user or a third party.

As a computer readable medium including at least computer program code for outputting audio data to be played on a media output device, one embodiment of the invention includes at least: computer program code for identifying audio data for a media item to be played; computer program code for determining whether supplementary audio data is associated with the media item; computer program code for accessing the supplementary audio data associated with the media item when it is determined that supplementary audio data is associated with the media item; computer program code for mixing the supplementary audio data with the identified audio data; and computer program code for outputting the mixed audio data to the media output device.

Other aspects and embodiments of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved techniques for providing supplementary media for media items. The media items are typically fixed media items. The supplementary media is one or more of audio, video (including animation), image (e.g., photo), or text that is provided by a user to supplement (e.g., personalize, customize, annotate, etc.) the fixed media items. In one embodiment, the supplementary media can be provided by user interaction with an on-line media store where media items can be browsed, searched, purchased and/or acquired via a computer network. In another embodiment, the supplementary media can be generated on a playback device.

The supplementary media can be used for various different purposes, such as an annotation to the associated media item, a personal message to the recipient of the associated media item, or a comment or feedback on the associated media item. The supplementary media can also be considered a media monogram. The media monogram can, for example, be provided by a gift giver, artist, publisher, or annotator. The invention can be implemented in numerous ways, including as a method, system, device, apparatus, or computer readable medium. Several embodiments of the invention are discussed below.

In one embodiment, the media item is an audio item, and the supplementary media is supplementary audio. When the audio item is to be played back, the supplementary audio that is associated with the audio item can be combined with the audio for the audio item. The combined audio can then be played.

One aspect of the invention pertains to techniques for announcing descriptive information pertaining to a media item being played or to be played. For example, title and/or artist information can be announced when a media item begins to be played. As another example, commentary on a media item can be announced while playing the media item.

Another aspect of the invention pertains to techniques for facilitating personal media messages that are associated with one or more media items. The personal messages can include audio, video, image or text components. The personal media messages can be recorded, associated with the one or more media items, provided to one or more recipients, and then presented to the one or more recipients along with the one or more media items.

Embodiments of the invention are discussed below with reference to FIGS. 1-12. However, those skilled in the art will readily appreciate that the detailed description given herein with respect to these figures is for explanatory purposes as the invention extends beyond these limited embodiments.

Figure 1:
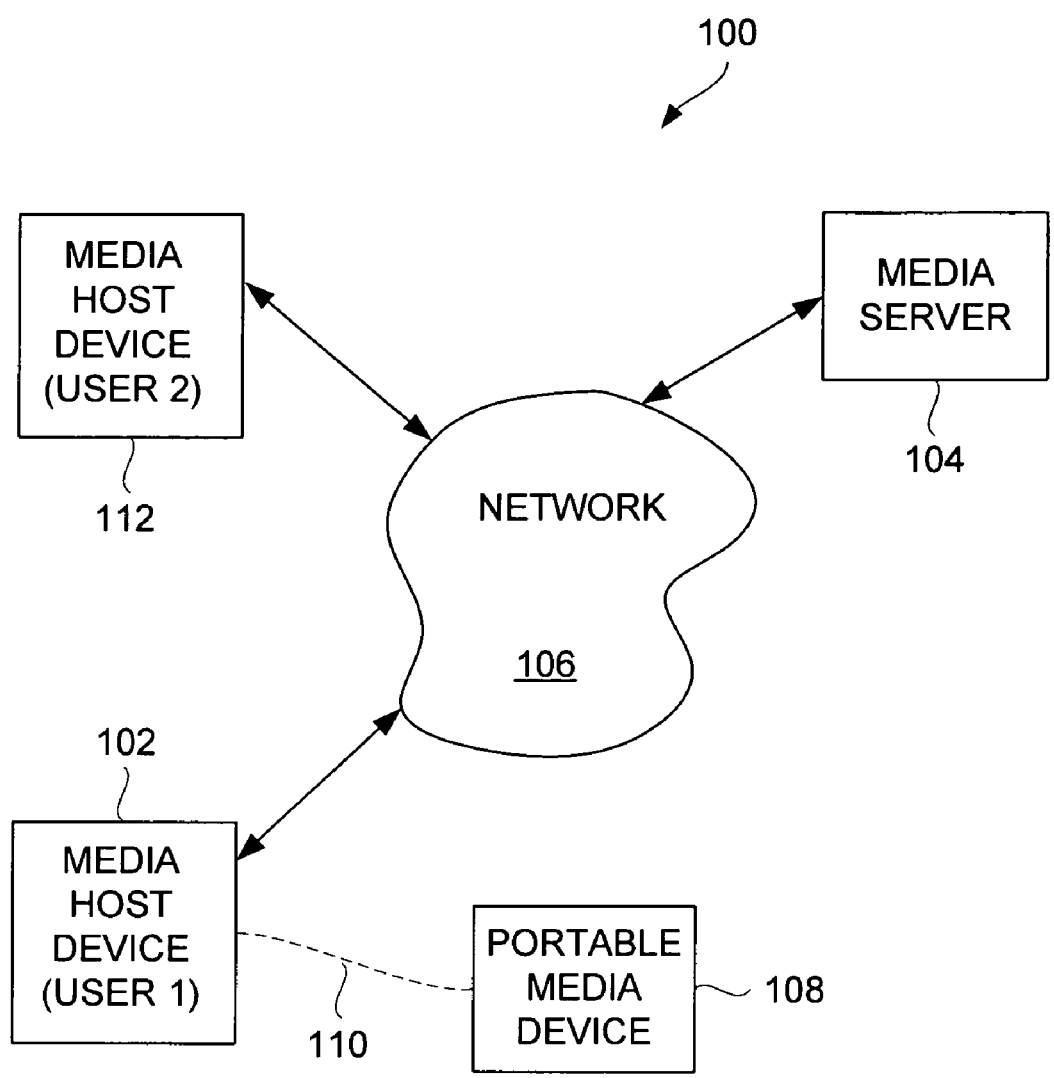
FIG. 1 is a block diagram of a media system that supports supplementary media data according to one embodiment of the invention.

FIG. 1 is a block diagram of a media system 100 that supports supplementary media data according to one embodiment of the invention. The media system 100 includes a media host device 102 associated with a first user. The first user can utilize the media host device 102 to access a media server 104. Upon accessing the media server 104, the first user is able to acquire digital media assets from the media server 104 and provide them to the media host device 102. Here, the first user can purchase the digital media assets, preview the digital media assets or otherwise obtain limited rights to digital media assets. The host media device 102 interconnects with the media server 104 through a network 106. The network 106 is, for example, a data network, such as a global computer network (e.g., the World Wide Web). The media host device 102 can connect to the network 106 through a wired and/or wireless manner.

A portable media device 108 can also couple to the media host device 102. As a result, digital media assets that are present on the media host device 102 can be provided to the portable media device 108. The portable media device 108 can couple to the media host device 102 over a link 110. The link 102 can be a wired link or a wireless link. In one embodiment, the portable media device 108 is a portable media player. In one example, the portable media player is battery-powered and handheld and able to play music and/or videos.

Still further, the media system 100 includes a media host device 112. The media host device 112 is associated with a second user. The media host device 112 also connects to the network 106. In one embodiment, the second user can utilize the media host device 112 to provide (e.g., purchase) a gift for the benefit of the first user. As an example, the second user can purchase a gift certificate available from the media server 104. The gift certificate pertains to gifting media items, such as songs, videos, photos, and audiobooks. In doing so, the second user can provide a media message that is to be included or associated with the gift certificate. The media message can include one or more of audio, video, image or text components. For example, the media message can be an audio message, a video message, an image or slideshow message, a text message, or some combination thereof. Thereafter, when the gift certificate is delivered to the first user, in an electronic manner, the associated media message can also provided to the first user.

After receiving the gift certificate, the first user can utilize the media host device 102 to interact with the media server 104 to acquire digital media assets using the gift certificate. In one example, the digital media assets acquired with the gift certificate can be associated with the media message that was associated with the gift certificate. Hence, when such digital media assets are provided to the media host device 102, the associated media message can also be provided. When these digital media assets are later played, in one implementation, the media message can be mixed in with the digital media assets being played, either on the media host device 102 or on the associated portable media device 108. For example, the associated portable media device 108 that provides playback of the digital media asset can operate to mix the media message with the digital media asset at time of playback. In another implementation, the media message can be mixed (i.e., pre-mixed) in with the digital media assets at the media server 104 prior to being provided to the media host device 102. In yet still another implementation, the media message can be mixed in with the digital media assets by another processing device, such as a remote server. In any case, when the digital media assets are played, the media message can be played. For example, the media message might be mixed in with an initial portion of the digital media assets so that the user is reminded of the media message when the digital media asset is played.

As another example, a user can purchase a digital media asset from the media server 104. In doing so, the user can provide a media message that is to be included or associated with the digital media asset. The media message can include one or more of audio, video, image or text components. For example, the media message can be an audio message, a video message, an image or slideshow message, a text message, or some combination thereof. The media message can be included or associated with the digital media asset at the media server 104 or the media host device 102 or the associated portable media device 108. Accordingly, when the digital media asset is played at the media host device 102 or the associated portable media device 108, the media message can be played.

In another example, when the first user utilizes the media host device 102 to acquire digital media assets from the media server 104, the first user can also provide an media message to be associated with the digital media assets. The first user can then give the digital media assets to another or retain them for himself. The associated media messages can be available (e.g., played) when such digital media assets are played.

Figure 2:
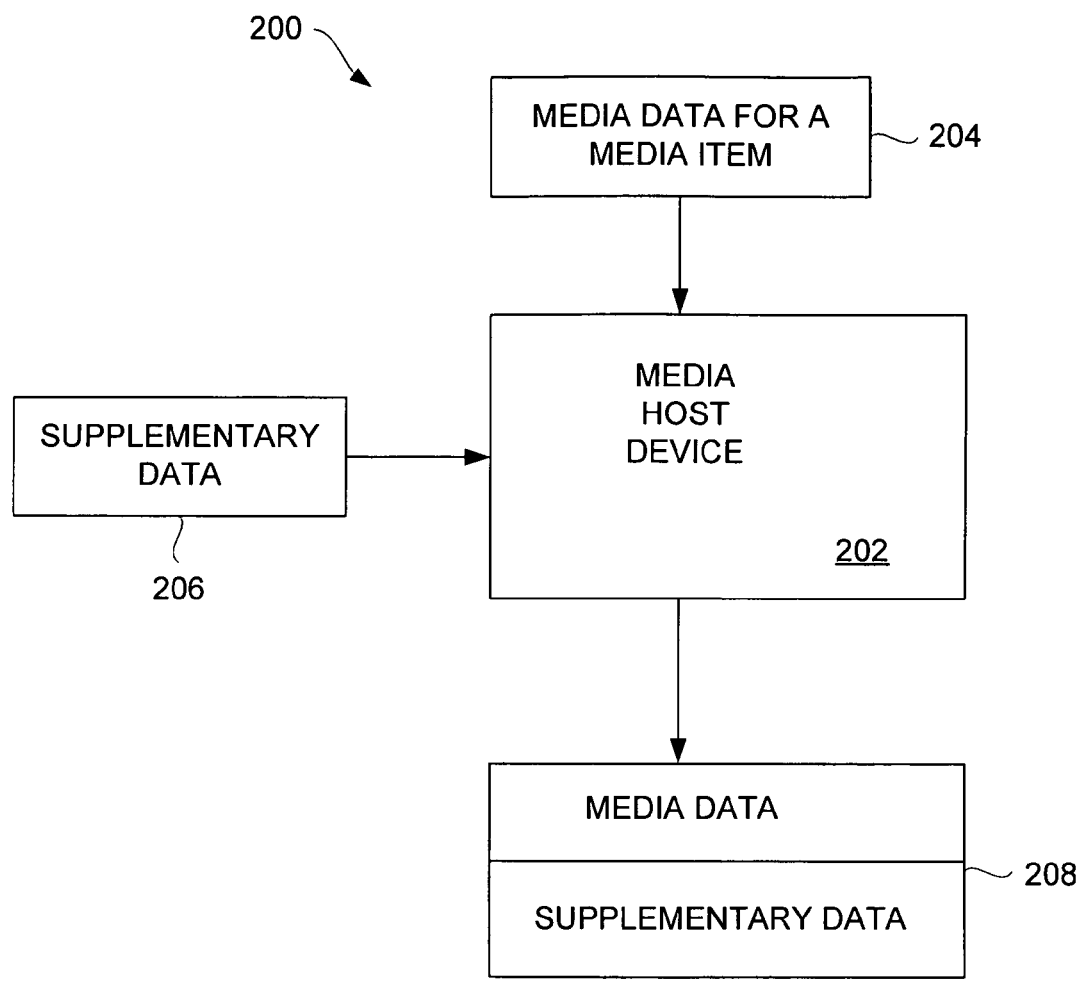
FIG. 2 is a block diagram of supplementary data system according to one embodiment of the invention.

FIG. 2 is a block diagram of supplementary data system 200 according to one embodiment of the invention. The supplementary data system 200 includes a media host device 202. The media host device 202 can, for example, represent the media host device 102 illustrated in FIG. 1. The host media device 202 is, for example, a personal computer. The media host device 202 receives media data for a media item 204. The media item can also be referred to as a digital media asset. The media data for the media item 204 can be provided from a variety of different sources to the media host device 202. In one example, the media data can be provided by a media server. In another example, the media data can be provided by a removable data storage device, such as a memory card or a compact disk. Regardless of the source for the media data, the media data can, for example, be audio, video or image data. In other words, the media data for a given media item can correspond to a song, video, photo or slideshow. Often, the media data for the media item is fixed by its distributor or copyright owner.

The media host device 202 also receives supplementary data 206. The supplementary data 206 pertains to either an attribute of the media item or a message to be provided or associated with the media item. The supplementary data 206 may be audio data, video data, image data and/or textual data. In any event, the supplementary data 206 is applied to the host media device 202. When the supplementary data 206 pertains to an attribute of the media item, the supplementary data 206 can be provided with the media data for the media item 204. For example, attributes for a media item (i.e., digital media asset) can be provided with the media item. On the other hand, when the supplementary data 206 is a message, the message can be independently provided to the host media device 202 where it is then associated with the media item.

In one embodiment, the supplementary data 206 can be associated with the media item via a database. For example, the database may store an audio file pointer and media item attributes, such as metadata, and the supplementary data 206. In this manner, storage in the database can serve to associate the supplementary data 206 with the media item.

The host media device 202 operates to associate the supplementary data 206 to the media data for the media item 204. The resulting data output by the host media device 202 can be referred to as enhanced media data 208. The enhanced media data 208 includes the media data as well as the supplementary data. In this manner, the supplementary data is associated with the media data. Hence, when a media player subsequently plays the enhanced media data 208, the supplementary data can be output in an audio, video, image and/or text fashion together with the media data also being output at that time. For example, when the media data is audio data that pertains to a song and when the supplementary data is audio data (supplementary audio data), then the audio output from the media player result from mixing together the audio data for the song and the supplementary audio data.

FIGS. 3A-10 described below provide additional details, embodiments and implementations of processing and operations performed when the supplementary data is audio data (supplementary audio data). Often, the media data is also audio data, such as pertaining to a song. Nevertheless, as noted above, it should be understood that neither the media data nor the supplementary data is limited to audio data, and that like processing and operations can be used with other media types besides audio.

Figure 3A:
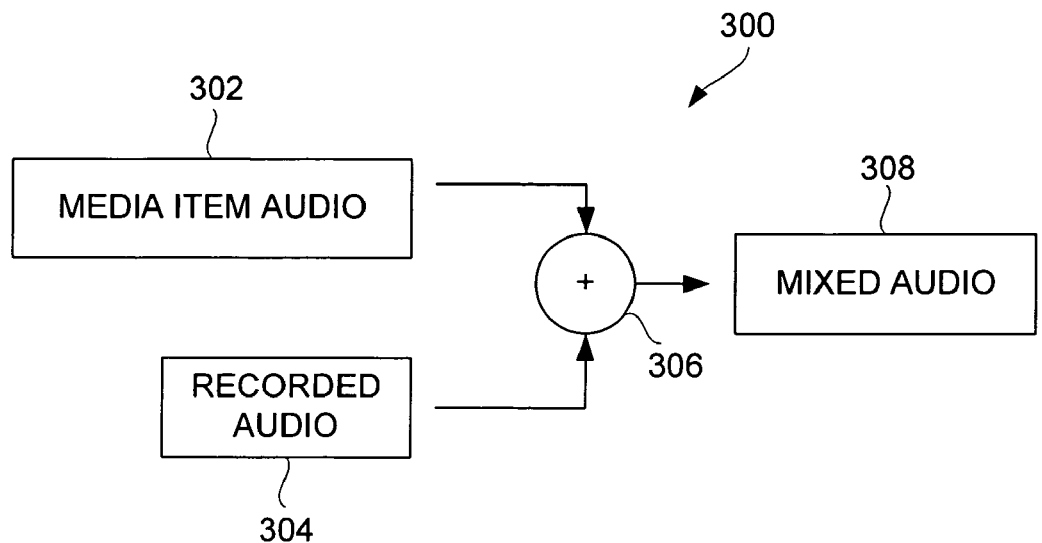
FIG. 3A is a schematic diagram of an audio mixture flow according to one embodiment of the invention.

FIG. 3A is a schematic diagram of an audio mixture flow 300 according to one embodiment of the invention. The audio mixture flow 300 receives media item audio 302 as well as recorded audio 304. The recorded audio 304 pertains to an annotation or message that is to be output concurrently with the output of the media item audio 302. Hence, the audio mixture flow 300 includes a mixer 306. The mixer 306 receives the media item audio 302 and the recorded audio 304 and combines such audio inputs to output mixed audio 308.

Figure 3B:
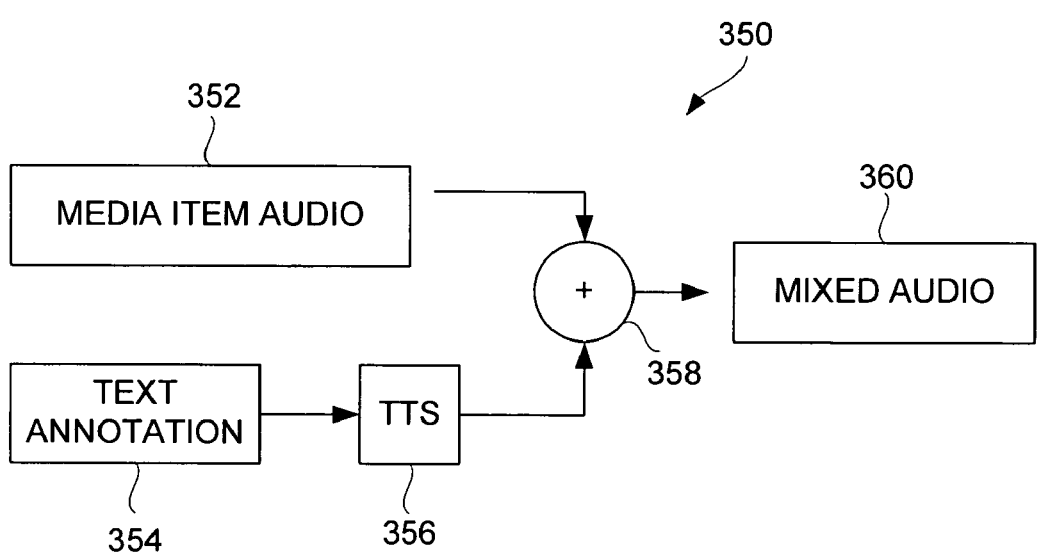
FIG. 3B is a schematic diagram of an audio mixture flow according to another embodiment of the invention.

FIG. 3B is a schematic diagram of an audio mixture flow 350 according to another embodiment of the invention. The audio mixture flow 350 includes media item audio 352 as well as a text annotation 354 to be associated with the media item audio 352. Since the supplementary data in this case is the text annotation 354, the text annotation 354 is converted to audio (i.e., speech) by a text-to-speech converter (TTS) 356. The output from the TTS 356 is supplied to a mixer 358. The media item audio 352 is also supplied to the mixer 358. The output of the mixer 358 is mixed audio 360 that represents a mixture of the media item audio 352 and the audio conversion of the text annotation 354.

It should be noted that in the case where the supplementary data (or media) is text (e.g., a text message), the text can be converted into audio which is thereafter combined with the media item. In one embodiment, a professional voice talent can record the audio message (from the submitted text message). An online media store, artist, producer, owner can offer the service of recording of the audio messages. In another embodiment, the text-to-speech conversion can be done by a text-to-speech converter which yields a synthesized voice. The text-to-speech conversion can be done in media device that is to playback the media, assuming the media device supports text-to-speech conversion. Here, the text message can be provided with the media item (with low storage and bandwidth needs) and then, on playback, the media device can convert the text message into an audio message and combined with the media item being played. The user of the media device may be able to choose a particular voice to be used with the audio message.

Figure 4:
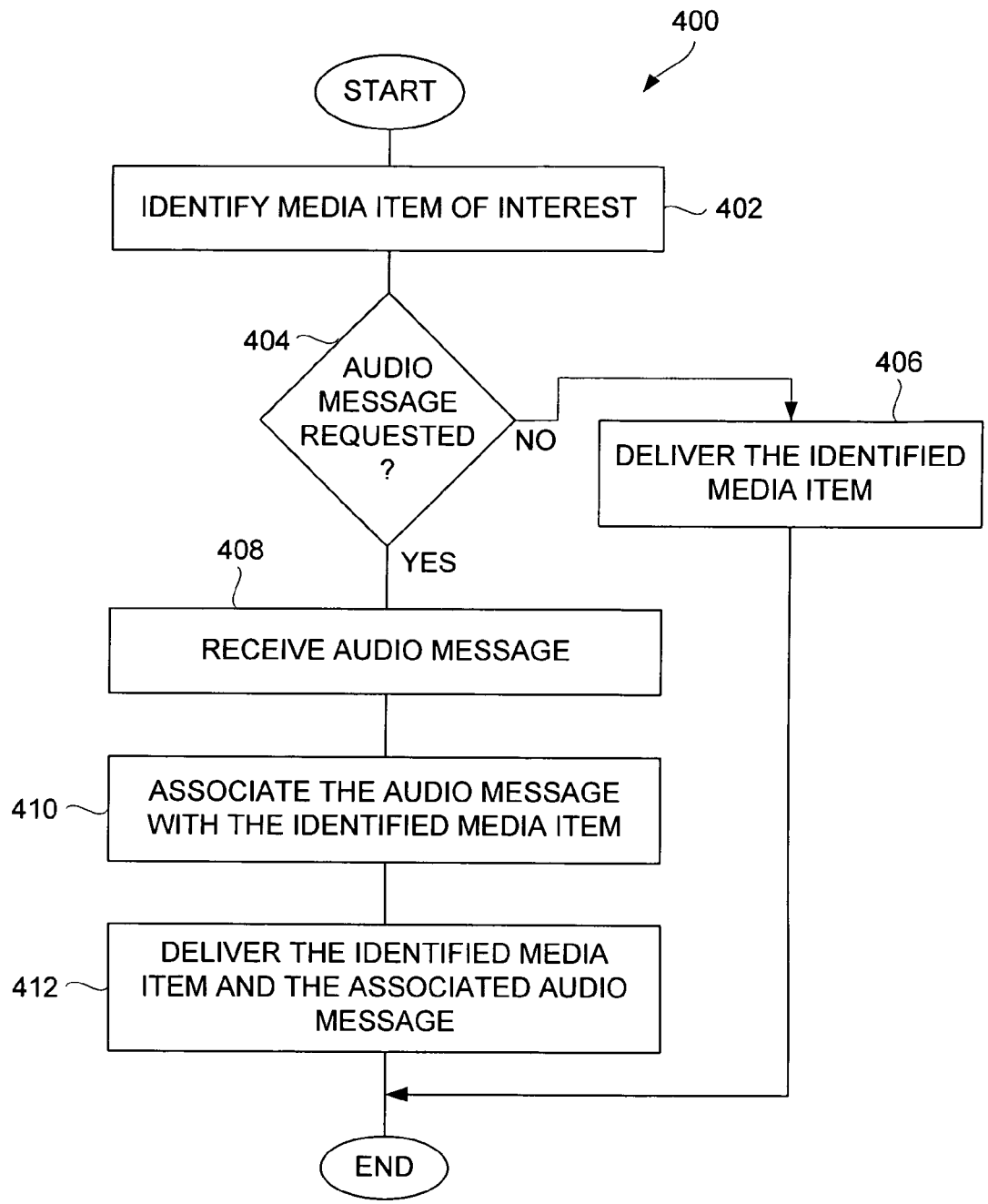
FIG. 4 is a flow diagram of an audio message creation process according to one embodiment of the invention.

FIG. 4 is a flow diagram of an audio message creation process 400 according to one embodiment of the invention. The audio message creation process 400 is, for example, performed by a remote computing device (e.g., server computer), such as the media server 104 illustrated in FIG. 1, or a local computing device (e.g., client computer), such as the media host device 112 illustrated in FIG. 1.

The audio message creation process 400 initially identifies 402 a media item of interest. The media item of interest can be identified 402 through various operations, including browsing, searching, navigating, etc. The media item of interest can be identified 402 in the context of a purchase of the media item, an enhancement of the media item, or the like.

Once a media item of interest has been identified 402, a decision 404 determines whether an audio message is requested. Here, it is determined whether or not an audio message, i.e., supplementary data, is to be associated with the media item of interest. When the decision 404 determines that an audio message is not requested, then the identified media item is delivered 406 to the appropriate recipient without providing any associated audio message. On the other hand, when the decision 404 determines that an audio message is requested, then an audio message is received 408. Once the audio message has been received 408, the audio message is associated 410 with the identified media item. The audio message can, for example, be associated 410 with the identified media item by (i) adding the audio message into an audio file for the identified media item, or (ii) adding an indicator for another audio file containing the audio message into an audio file for the identified media item. Thereafter, the identified media item as well as the associated audio message are delivered 412 to the appropriate recipient. Following the blocks 408 and 412, the audio message creation process 400 is complete and ends.

Figure 5:
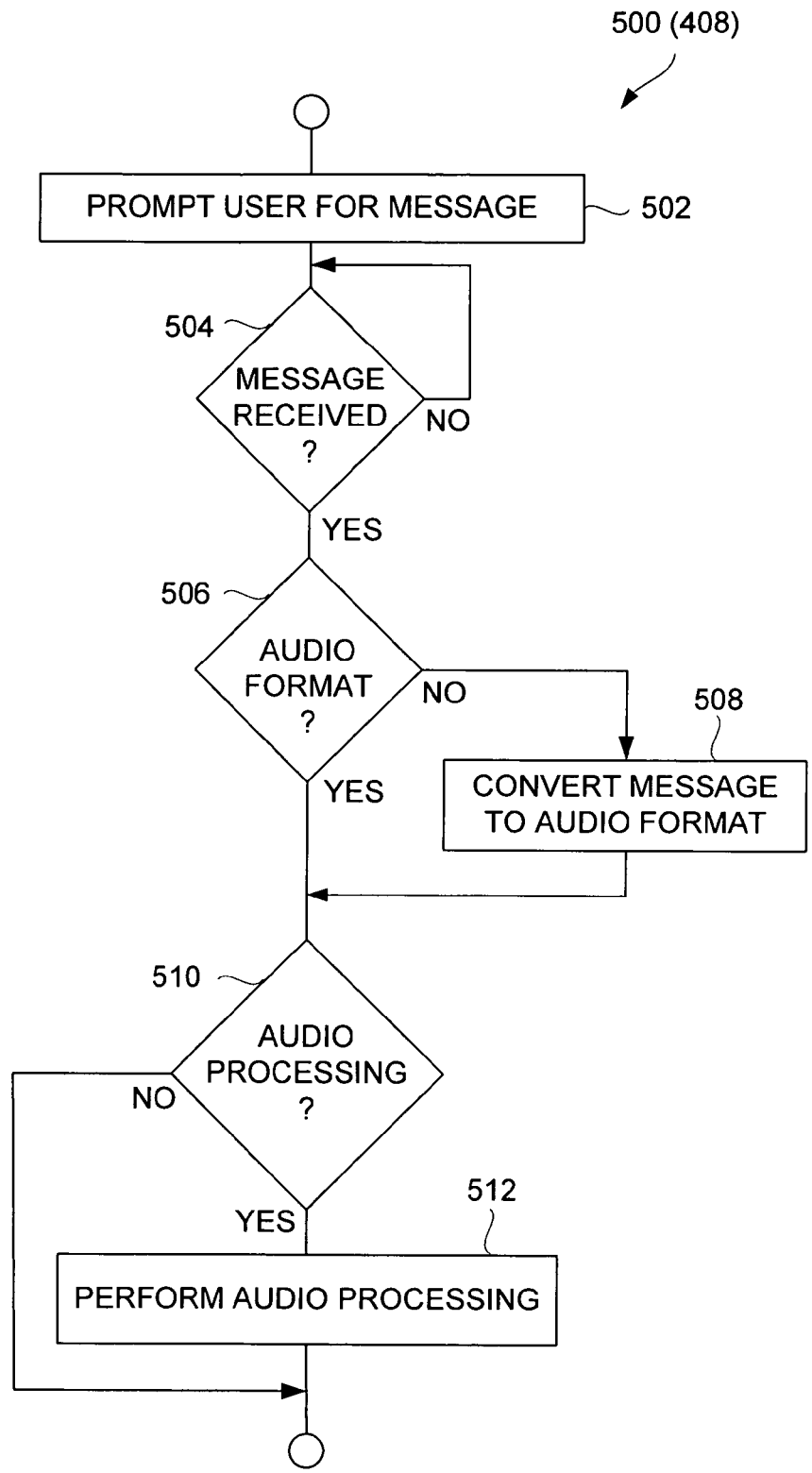
FIG. 5 is a flow diagram of an audio message process according to one embodiment of the invention.

FIG. 5 is a flow diagram of an audio message process 500 according to one embodiment of the invention. The audio message process 500 can, for example, represent detailed processing associated with the block 408 illustrated in FIG. 4. In this embodiment, the audio message process 500 initially prompts 502 a user for a message. In one example, the user is able to provide the message in either an audio format or a text format. In any case, after the user has been prompted 502 for a message, a decision 504 determines whether a message has been received from the user. When the decision 504 determines that a message has not yet been received, the decision 504 causes the audio message process 500 to await such a message. Once the decision 504 determines that a message has been received, a decision 506 determines whether the message has an audio format. In other words, the decision 506 determines whether the message received was an audio message. When the decision 506 determines that the message does not have an audio format, then the message is converted 508 to an audio format. For example, the conversion 508 can involve text-to-speech (TTS) conversion. On the other hand, when the decision 506 determines that the message received does have an audio format, then the block 508 is bypassed.

Following the block 508, or its being bypassed, a decision 510 determines whether audio processing is to be performed on the message. When the decision 510 determines that audio processing is to be performed, then audio processing is performed 512 on the message. The audio processing can serve to modify the audio message so that it is more suitable to be combined with a media item. Additional details on audio processing are described below. On the other hand when the decision 510 determines that audio processing is not desired, the block 512 is bypassed. Following the block 512 or its being bypassed, the audio message process 500 is completed, and processing can return to block 410 of the audio message creation process 400.

It should be understood that blocks 506 and 508 are not needed if the user is only able to provide a message in an audio format. However, even in such case, blocks 506 and 508 could operate to check for an appropriate audio format and then convert the audio format as desired.

Although the audio processing associated with block 512 is provided in the context of audio message creation, it should be understood that the audio processing can also, or alternatively, be performed after delivery of the media item to its recipient. More generally, any of the audio message creation process 400 or the audio message process 500 can be performed at a remote computing device in advance, or can be performed at a local computing device on demand, such as when the media item is to be played.

Figure 6A:
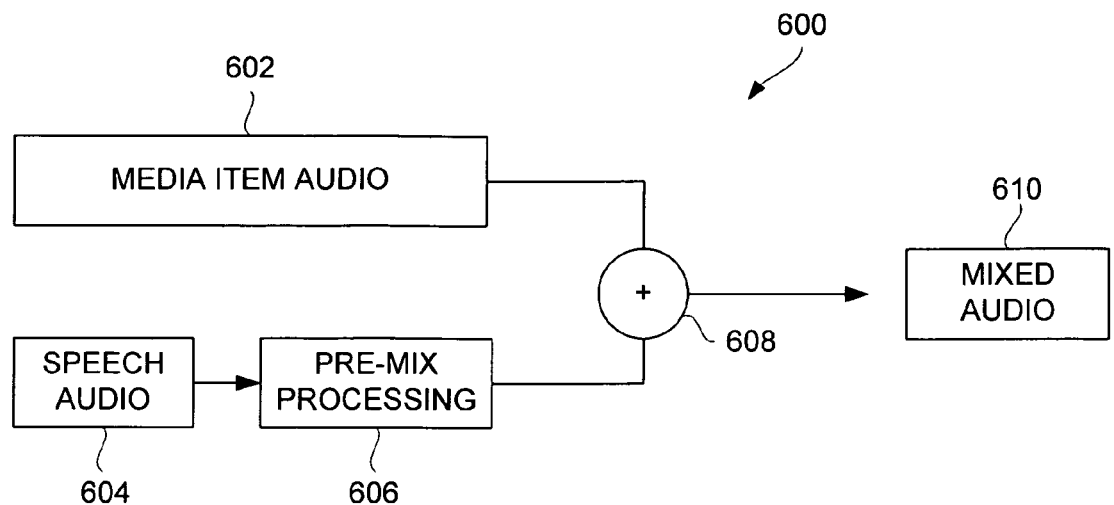
FIG. 6A is a schematic diagram of an audio mixture flow according to one embodiment of the invention.

FIG. 6A is a schematic diagram of an audio mixture flow 600 according to one embodiment of the invention. The audio mixture flow 600 receives media item audio 602 as well as speech audio 604. In this embodiment, the speech audio 604 represents supplementary data that is to be combined with the media item audio 602. However, in this embodiment, pre-mix processing 606 is performed on the speech audio 604 prior to the mixing. The pre-mix processing 606 is particularly useful when the speech audio 604 is to be combined with audio data for a song (e.g., music track). The audio mixture flow 600 also includes a mixer 608. The mixer 608 receives the media item audio 602 and the audio output by the pre-mix processing 606. The mixer 608 produces mixed audio 610.

Figure 6B:
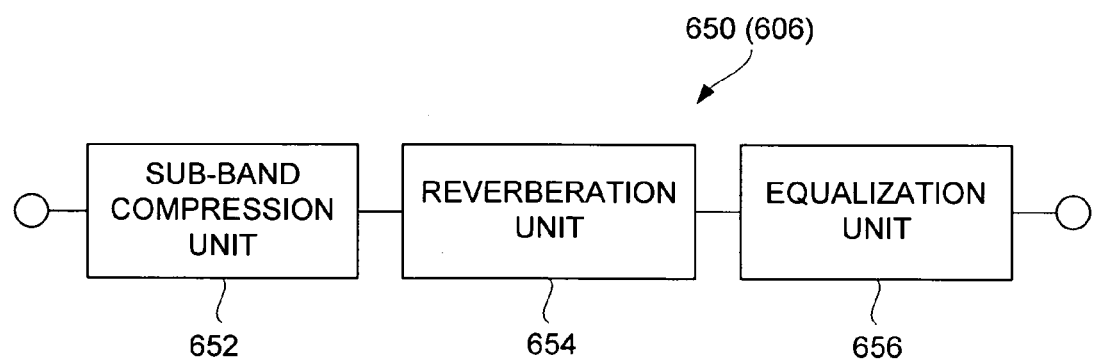
FIG. 6B is a block diagram of an audio modification process according to one embodiment of the invention.

FIG. 6B is a block diagram of an audio modification process 650 according to one embodiment of the invention. The audio modification process 650 can, for example, represent audio processing associated with the pre-mix processing 606 illustrated in FIG. 6A. The audio modification process 650 receives incoming audio and outputs processed audio. The incoming audio is first provided to a sub-band compression unit 652. At the sub-band compression unit 652, the sub-bands are compressed to facilitate mixing with an audio item. Next, the incoming audio is provided to a reverberation unit 654. The reverberation unit 654 adds a small amount of reverberation to the audio to again improve the sound quality of the mixed audio. Next, the incoming audio is provided to an equalization unit 656. The equalization unit 656 performs equalization operations to again facilitate mixture with the media item audio. The output from the equalization unit 656 is the processed audio that can be provided to a mixer (e.g., the mixer 608).

In one embodiment, the audio processing (or audio enhancement processing), such as the pre-mix processing 606 or the audio modification process 650, can provide fading and speech synthesis operations. For example, when the supplementary audio is to be output, the media item audio (e.g., music) can be faded out (i.e., attenuated). The general idea is to make the supplementary audio sound harmonious with the media item audio. Fading attenuates one audio source typically while increasing another audio source. The speech synthesis can operate, in one embodiment, to provide the audio modification process 650. Namely, sub-band compression, reverberation and equalization operations are speech synthesis operations that can enhance the supplementary sound such that it blends with the media item audio. For example, the speech synthesis can enable the supplementary audio data to be mixed such that it sounds as if the supplementary data was recorded at the same time as the media item audio. The supplementary audio processing can be adapted to the environment and recording conditions of the media item audio to homogenize the content. Various other techniques that can be used to enhance the supplementary audio to make it blend with the media or sound more "interesting" include: (1) locating the audio in left-to-right panning (for stereo recordings) or in 3D space (for 3D audio), (2) single-band dynamic compression, (3) echo reduction, (4) noise reduction (particularly if the sender recorded his/her own voice), (5) expansion (to increase the dynamic range or lower the noise floor, (6) limiting (to prevent clipping or distortion), (7) de-essing, (8) chorus, (9) flanging, (10) pitch-shift (e.g. to make the voice sound deeper and richer), (11) timescale modification (e.g. to speed up the supplementary audio so it will fit within the instrumental introduction of a piece of music and finish before the singer starts), (12) measurement of the spectral or ambient characteristics of the media item, and using this as a basis to decide how much equalization, reverb, etc to apply to make the supplementary audio match the ambience of the media item.

Figure 7:
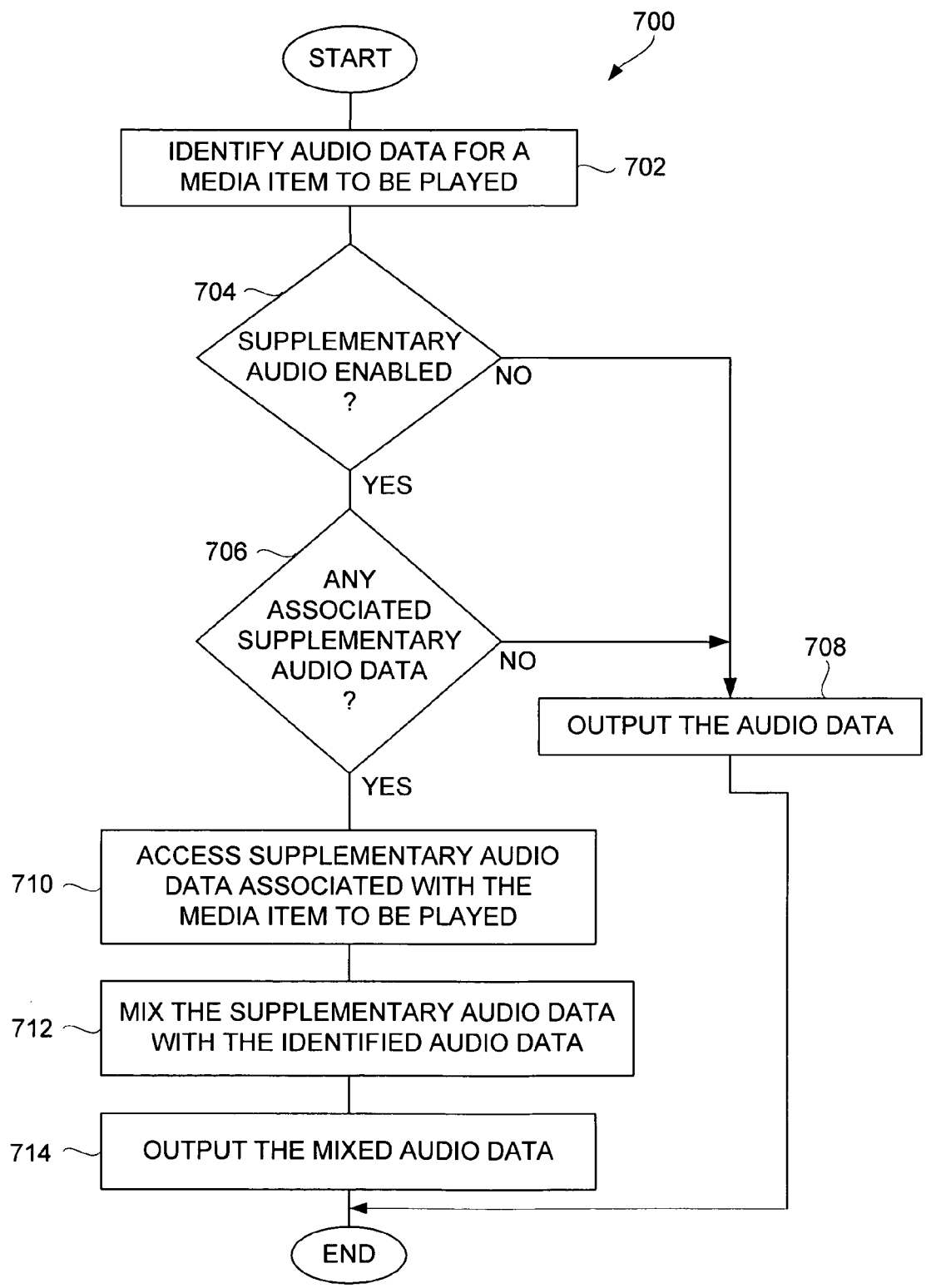
FIG. 7 is a flow diagram of an audio output process according to one embodiment of the invention.

FIG. 7 is a flow diagram of an audio output process 700 according to one embodiment of the invention. The audio output process 700 is, for example, performed by a media device, such as the media host device 102 or the portable media device 108 illustrated in FIG. 1.

The audio output process 700 identifies 702 audio data for a media item to be played. Typically, a user of the media device would cause the audio data to be identified 702. A decision 704 then determines whether supplementary audio is enabled. In one implementation, a user setting of the media device can determine whether supplementary audio is to be output when the audio data is played. When the decision 704 determines that supplementary audio data is enabled, a decision 706 determines whether there is any associated supplementary audio data for the identified audio data. Typically, the supplementary audio data, if any, would be provided with the identified audio data in a predetermined manner, such as in a particular track, in a header of the audio file, etc. In any case, when the decision 706 determines that there is no associated supplementary audio data, as well as when the decision 704 determines that supplementary audio is disabled, then the audio data is output 708. Here, the identified audio data is output 708 without including any supplementary audio data.

On the other hand, when the decision 706 determines that there is associated supplementary audio data, the supplementary audio data associated with the media item to be played is accessed 710. For example, if the supplementary audio data is provided in a separate track, the track is accessed. As another example, the supplementary audio data is provided in a header, then the header is accessed. In any case, after the supplementary audio data is accessed 710, the supplementary audio data is mixed 712 with the identified audio data for the media item to be played. The resulting mixed audio data is then output 714. For example, the audio data can be digital audio data that is output to a coder/decoder to produce audio signals for one or more speakers. Following the blocks 708 or 714, the audio output process 700 ends.

Figure 8:
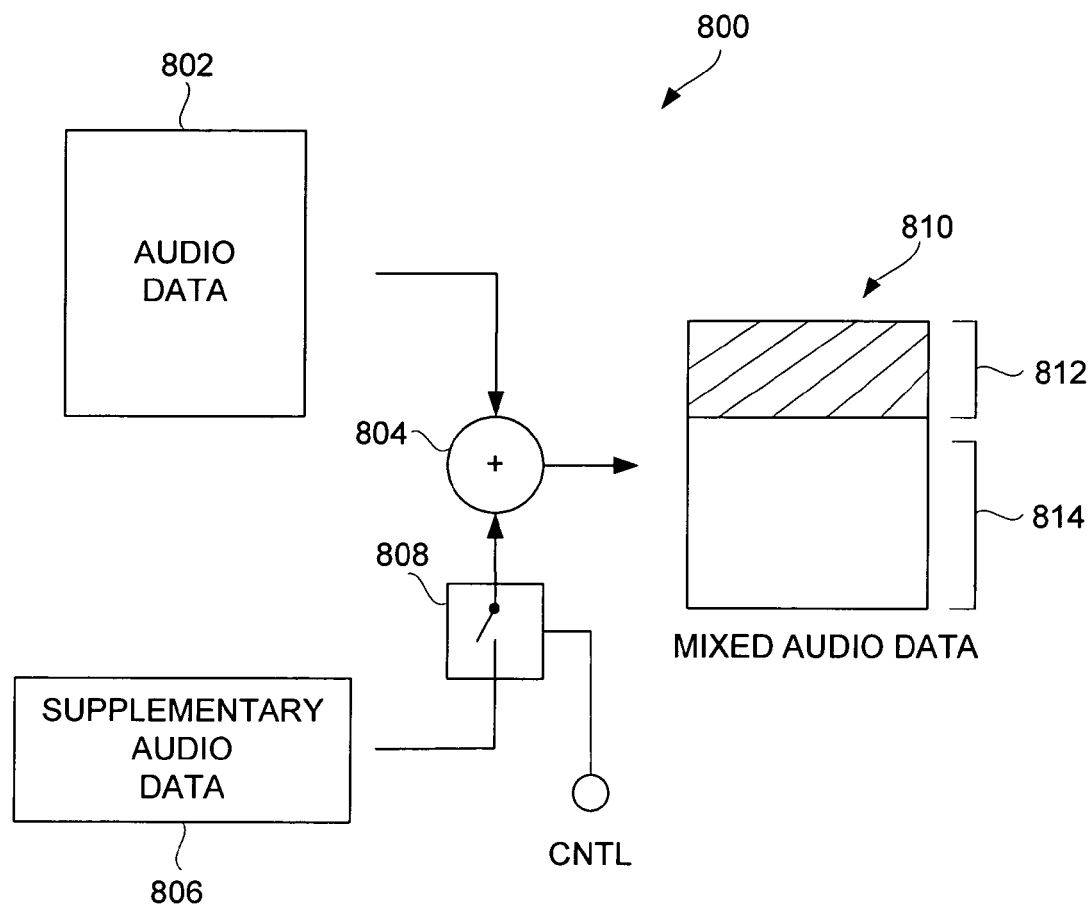
FIG. 8 is a schematic diagram of an audio mixture flow according to one embodiment of the invention.

FIG. 8 is a schematic diagram of an audio mixture flow 800 according to one embodiment of the invention. The audio mixture flow 800 represents an audio flow associated with playback of a digital media asset having supplementary audio data. The audio mixture flow 800 receives audio data 802 as well as supplementary audio data 806 that is associated with the audio data 802. The audio data 802 is supplied to a mixer 804. The supplementary audio data 806 is supplied to a selector 808. The mixer 804 and the selector 808 can be implemented by software or hardware. The selector 808 is controlled by a control signal (CNTL). Under the control of the control signal, the selector 808 either enables or disables mixing of the supplementary audio data 806 with the audio data 802. When the selector 808 disables mixing of the supplementary audio data 806, the mixer 804 merely outputs the audio data 802. However, when the selector 808 is enabled, the mixer 804 outputs the audio data 802 mixed with the supplementary audio data 806. The mixed audio data 810 being output typically has at least one portion that is a mixture of the audio data and the supplementary audio data and at least one portion that contains just the audio data.

As shown in FIG. 8, an initial portion 812 of the mixed audio data 810 represents a portion of the mixed audio data 810 where a mixture of the audio data 802 and the supplementary audio data 806 is present. A remaining portion 814 of the mixed audio data represents a portion of the mixed audio data 810 where only the audio data 802 is present. In this example, the supplementary audio data 806 is substantially smaller (e.g., in terms of play time and data size) than the audio data 802, hence, the mixing of the data is only done during an initial portion of the audio data. For example, if the supplementary audio data 806 were an announcement or a short message provided as an introduction to a media item (i.e., digital media asset) being played, the supplementary audio data 806 would be mixed with the audio data 802 by the mixer 804 such that it is mixed with the initial portion of the audio data 802 so that as the media item begins to be played, the introductory note can be heard.

Figure 9:
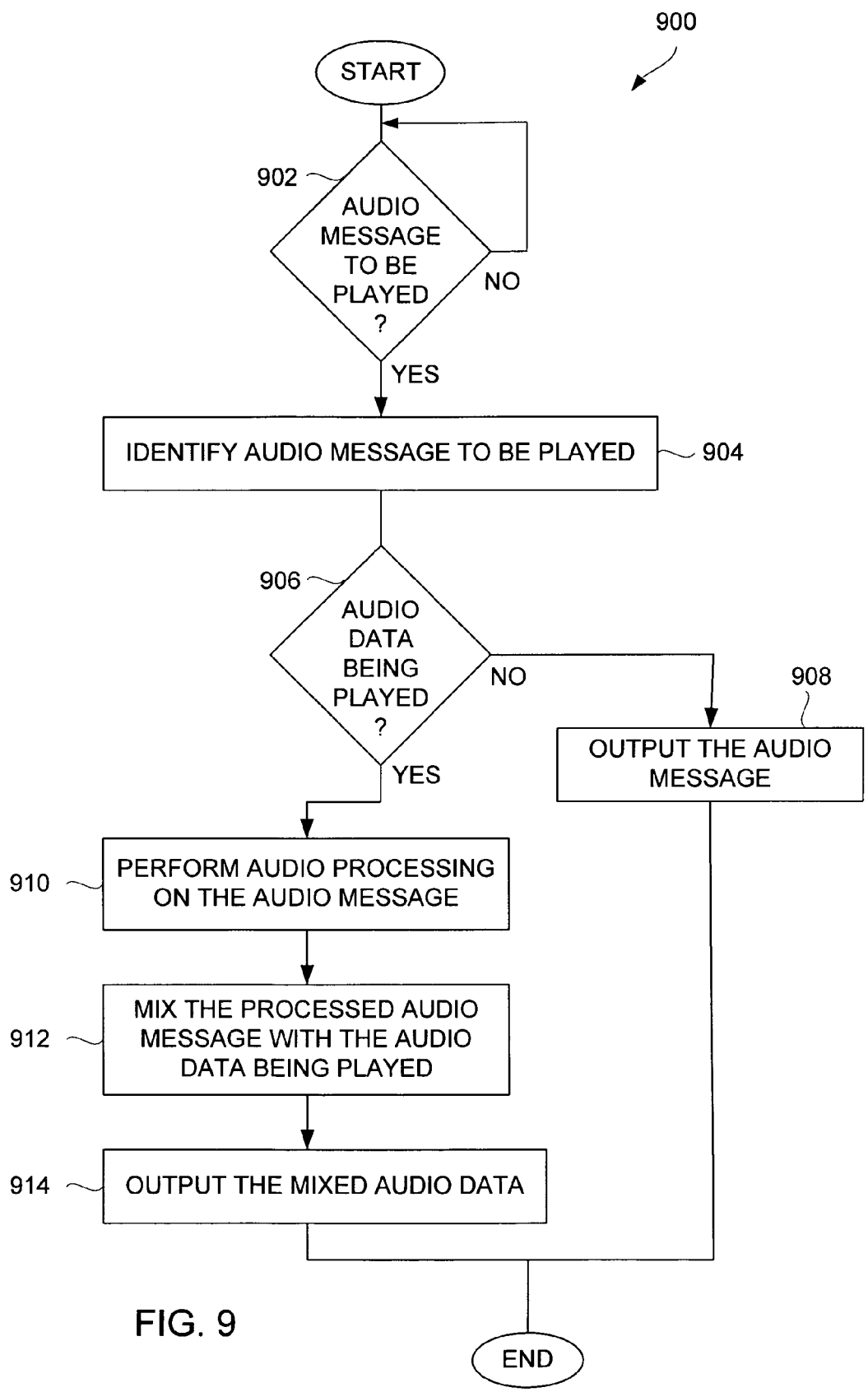
FIG. 9 is flow diagram of a play audio message process according to one embodiment of the invention.

FIG. 9 is flow diagram of a play audio message process 900 according to one embodiment of the invention. The play audio message process 900 is, for example, performed by a media device, such as the media host device 102 or the portable media device 108 illustrated in FIG. 1. The play audio message process 900 operates to play audio data associated with a media item (i.e., digital media asset), such as an audio track for a song as well as a previously provided audio message that is associated with the media item.

The play audio message process 900 begins with a decision 902. The decision 902 determines whether an audio message is to be played. In other words, when a media item is being played, an audio message can be mixed with the audio of the media item (e.g., audio track for a song) at any point during the playing of the media item. The timing at which the audio message is played can be predetermined, set by user settings, or on request (on-demand). For example, a user setting can enable or disable audio messages. As another example, a user setting can request that audio messages be played at the beginning of playing the corresponding media item. As still another example, an audio message can be played on demand upon a user's request. When the decision 902 determines that an audio message is not to be played at this time, the audio message process 900 awaits the need to play an audio message. In other words, the audio message process is effectively invoked only when an audio message needs to be played.

Once it is determined that an audio message is to be played, the audio message is identified 904. Typically, the audio message to be played is associated with a media item also being played or to be played. After the audio message to be played has been identified 904, a decision 906 determines whether audio data for the media item is being played. When the decision 906 determines that audio data is not being played, then the audio message is simply output 908. Here, there is no other audio data being played when the audio message is to be played. Hence, the audio message can be output 908 without any mixing operation with any other audio data.

On the other hand, when the decision 906 determines that audio data is being played, audio processing is performed 910 on the audio message. Here, the audio processing can serve to modify the audio characteristics of the audio message so that it provides a smoother audio mixture with the audio data being played. The audio processing in one embodiment can be as discussed with reference to FIG. 6B above. After the audio processing has been performed 910, the processed audio message is mixed 912 with the audio data being played. Then the mixed audio data is output 914. Following the blocks 908 and 914, the play audio message process 900 ends.

Although the play audio message process 900 includes the block 910 to provide audio processing on the audio message, it should be noted that the audio message can be pre-processed to provide such audio processing. In such case, the audio message being identified 904 can be the processed audio message, and in such case the block 910 may not be required in the play audio message process 900.

Figure 10:
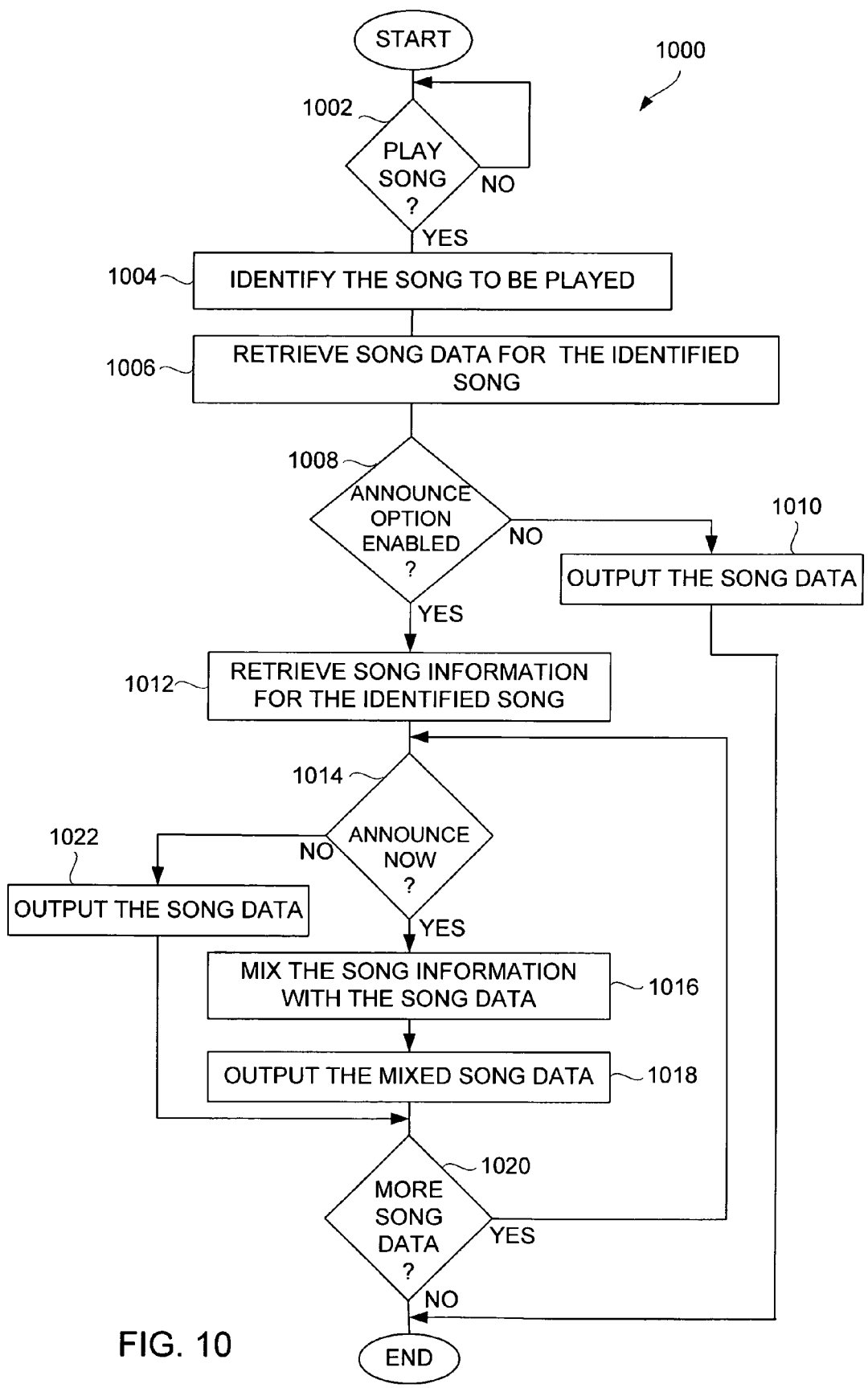
FIG. 10 is a flow diagram of a play song process according to one embodiment of the invention.

FIG. 10 is a flow diagram of a play song process 1000 according to one embodiment of the invention. The play song process 900 is, for example, performed by a media device, such as the media host device 102 or the portable media device 108 illustrated in FIG. 1. The play audio message process 900 operates to play audio data associated with a media item (i.e., digital media asset), such as an audio track for a song, as well as information pertaining to the media item. In one implementation, the portable media player is a portable music player.

The play song process 1000 begins with a decision 1002. The decision 1002 determines whether a song is to be played. Typically, a user of the media device will directly or indirectly request that the song be played. When the decision 1002 determines that a song is not to be played, then the play song process 1000 waits until a song is to be played. In other words, the play song process 1000 is effectively invoked when a song is to be played.

Once a song is to be played, the song to be played is identified 1004. Then, song data for the identified song is retrieved 1006. Typically, a song is to be played by a media device, such as a music player, that stores song data. Hence, the song data can be retrieved 1006 from the media device. More specifically, the media device includes a media storage device that stores the song data, and the retrieval 1006 of the song data is from the media storage device. As an example, the media storage device can be a disk drive, Flash memory, or removable memory card.

After the song data has been retrieved 1006, a decision 1008 determines whether an announce option is enabled. The announce option is a user setting that can enable or disable an announcement whenever a song is played. When the decision 1008 determines that the announce option is disabled, then the song data is output 1010. Here, the song data is output in a typical fashion so that the resulting audio sound can be heard by a user that requested that the song be played.

On the other hand, when the decision 1008 determines that the announce option is enabled, song information for the identified song is retrieved 1012. The song information, in one embodiment, pertains to attributes of the song. For example, the attributes of the song can pertain to title, artist, album and/or genre associated with the song. A decision 1014 then determines whether the announcement should occur now, in the context of the playing of the song data. Initially, the decision 1014 is determining whether the announcement should be provided at the beginning of the playing of the song data. When the decision 1014 determines that the announcement should occur at this time, then the song information is mixed 1016 with the initial portion of song data. The mixed song data is then output 1018. To the extent that the song information is not already in an audio format, a conversion from its current format to an audio format can be performed. However, typically, the song information would have already been processed into appropriate audio format. Additionally, in one embodiment, the song data can have its amplitude lowered when being mixed with the song information so that the user is able to discern the song information with greater ease.

After the mixed song data has been output 1018, a decision 1020 determines whether there is more song data to be output. Here, it should be noted that the output of the mixed song data 1018 occurs over a period of time depending upon the length of the song data. When the decision 1020 determines that there is more song data to be output, the play song process 100 returns to repeat the decision 1014 and subsequent operations. At this point, the play song process 1000 can reexamine whether it is now time to provide an announcement. In any case, when the decision 1014 determines that the announcement should not occur at this time, then the song data is output 1022 without any mixing of song information.

In general, the announcements can be provided at a predetermined time along the playing of the song data, at start of playing, randomly, on demand by a user, or even substantially continuously. The announcement could also specify when and/or where it should be provided. Still further, a user preference associated with the media device could determine or influence when the announcement is provided.

In any event, when the decision 1020 determines that all of the song data has been output, the play song process 1000 ends. Likewise, following block 1010, after all of the song data has been output, the play song process 1000 ends.

The process in FIG. 9 and FIG. 10 can be used for user navigation. Since audio announcements can be had in this manner, a user is able to navigate and otherwise interact with a media player without using a graphical user interface. For example, a menu item can be spoken when highlighted or selected by a user of the media player, even though media is being presented (e.g., played) by the media player. As a result, a user can still navigate and otherwise interact even if the media player has no display. Even if the media player does have a screen, if the user is busy watching something else and thus not able to watch a display, the user can still navigate and otherwise interact with the media player.

Figure 11:
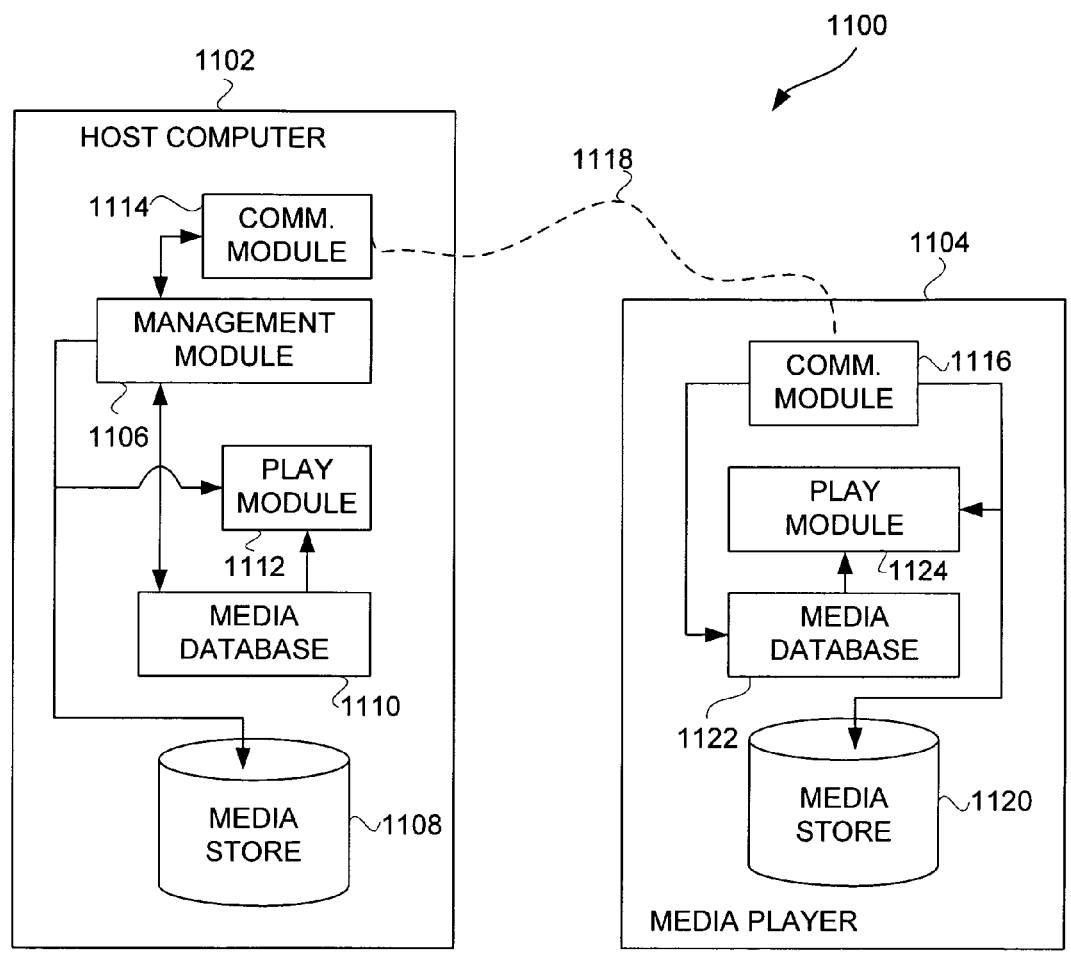
FIG. 11 is a block diagram of a media management system according to one embodiment of the invention.

FIG. 11 is a block diagram of a media management system 1100 according to one embodiment of the invention. The media management system 1100 includes a host computer 1102 and a media player 1104. The host computer 1102 is typically a personal computer. The host computer, among other conventional components, includes a management module 1106 which is a software module. The management module 1106 provides for centralized management of media items (and/or playlists) not only on the host computer 1102 but also on the media player 1104. More particularly, the management module 1106 manages those media items stored in a media store 1108 associated with the host computer 1102. The management module 1106 also interacts with a media database 1110 to store media information associated with the media items stored in the media store 1108.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time.

Still further, the host computer 1102 includes a play module 1112. The play module 1112 is a software module that can be utilized to play certain media items as well as associated supplementary data stored in the media store 1108 or the media database 1110. The play module 1112 can also display (on a display screen) or otherwise utilize media information from the media database 1110. Typically, the media information of interest corresponds to the media items to be played by the play module 1112.

The host computer 1102 also includes a communication module 1114 that couples to a corresponding communication module 1116 within the media player 1104. A connection or link 1118 removably couples the communication modules 1114 and 1116. In one embodiment, the connection or link 1118 is a cable that provides a data bus, such as a FIREWIRE™ bus or USB bus, which is well known in the art. In another embodiment, the connection or link 1118 is a wireless channel or connection through a wireless network. Hence, depending on implementation, the communication modules 1114 and 1116 may communicate in a wired or wireless manner.

The media player 1104 also includes a media store 1120 that stores media items within the media player 1104. Optionally, the media store 1120 can also store data, i.e., non-media item storage. The media items being stored to the media store 1120 are typically received over the connection or link 1118 from the host computer 1102. More particularly, the management module 1106 sends all or certain of those media items residing on the media store 1108 over the connection or link 1118 to the media store 1120 within the media player 1104. Additionally, the corresponding media information for the media items that is also delivered to the media player 1104 from the host computer 1102 can be stored in a media database 1122. In this regard, certain media information from the media database 1110 within the host computer 1102 can be sent to the media database 1122 within the media player 1104 over the connection or link 1118. Still further, playlists identifying certain of the media items can also be sent by the management module 1106 over the connection or link 1118 to the media store 1120 or the media database 1122 within the media player 1104.

Furthermore, the media player 1104 includes a play module 1124 that couples to the media store 1120 and the media database 1122. The play module 1124 is a software module that can be utilized to play certain media items as well as associated supplementary data stored in the media store 1120 or the media database 1110. The play module 1124 can also display (on a display screen) or otherwise utilize media information from the media database 1122. Typically, the media information of interest corresponds to the media items to be played by the play module 1124.

In one embodiment, the media player 1104 has limited or no capability to manage media items on the media player 1104. However, the management module 1106 within the host computer 1102 can indirectly manage the media items residing on the media player 1104. For example, to "add" a media item to the media player 1104, the management module 1106 serves to identify the media item to be added to the media player 1104 from the media store 1108 and then causes the identified media item to be delivered to the media player 1104. As another example, to "delete" a media item from the media player 1104, the management module 1106 serves to identify the media item to be deleted from the media store 1108 and then causes the identified media item to be deleted from the media player 1104. As still another example, if changes (i.e., alterations) to characteristics of a media item were made at the host computer 1102 using the management module 1106, then such characteristics can also be carried over to the corresponding media item on the media player 1104. In one implementation, the additions, deletions and/or changes occur in a batch-like process during synchronization of the media items on the media player 1104 with the media items on the host computer 1102.

In another embodiment, the media player 1104 has limited or no capability to manage playlists on the media player 1104. However, the management module 1106 within the host computer 1102 through management of the playlists residing on the host computer can indirectly manage the playlists residing on the media player 1104. In this regard, additions, deletions or changes to playlists can be performed on the host computer 1102 and then be carried over to the media player 1104 when delivered thereto.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 12:
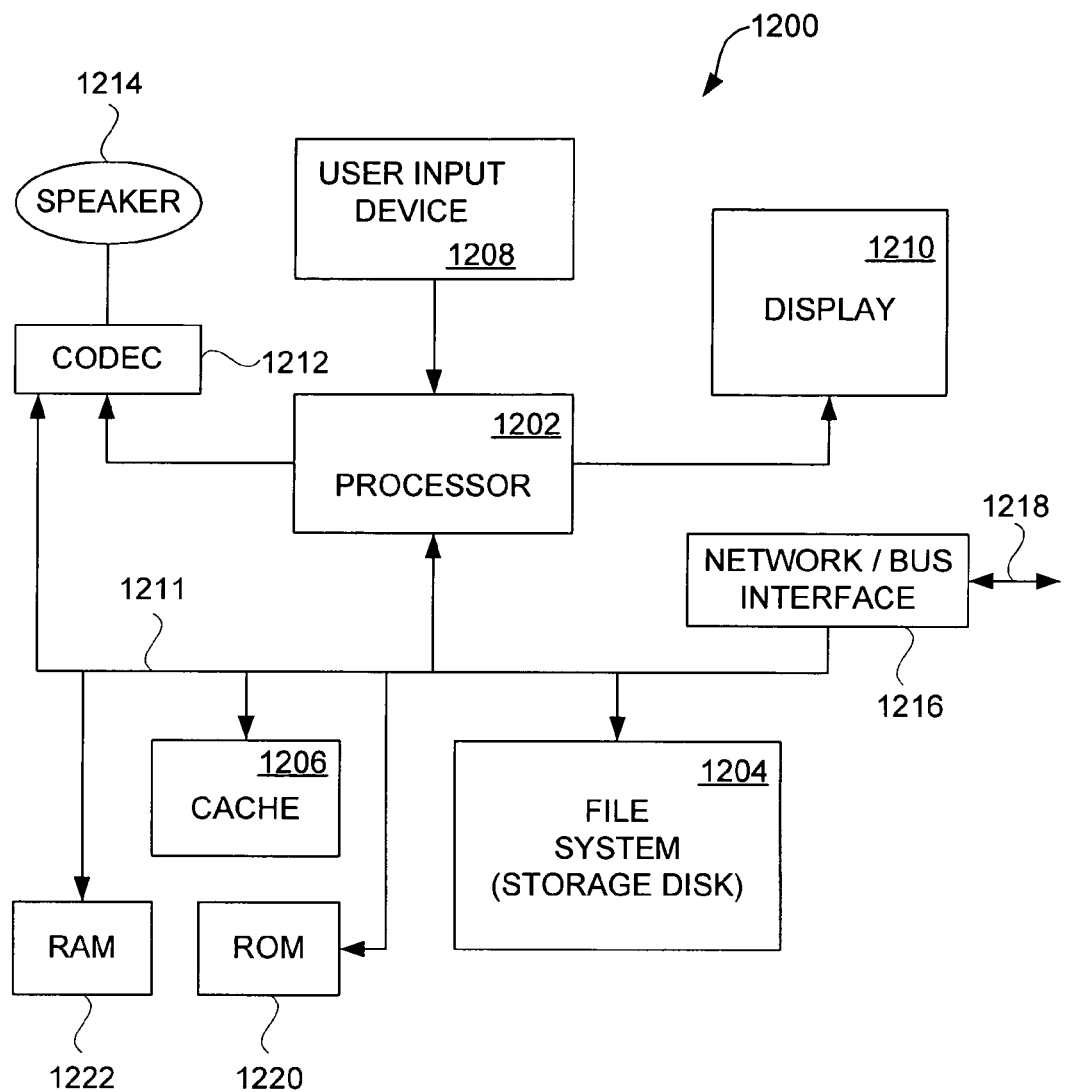
FIG. 12 is a block diagram of a media player according to one embodiment of the invention.

FIG. 12 is a block diagram of a media player 1200 according to one embodiment of the invention. The media player 1200 includes a processor 1202 that pertains to a microprocessor or controller for controlling the overall operation of the media player 1200. The media player 1200 stores media data pertaining to media items in a file system 1204 and a cache 1206. The file system 1204 is, typically, a storage disk or a plurality of disks. The file system 1204 typically provides high capacity storage capability for the media player 1200. The file system 1204 can store not only media data but also non-media data (e.g., when operated in a disk mode). However, since the access time to the file system 1204 is relatively slow, the media player 1200 can also include a cache 1206. The cache 1206 is, for example, Random-Access Memory (RAM) provided by semiconductor memory. The relative access time to the cache 1206 is substantially shorter than for the file system 1204. However, the cache 1206 does not have the large storage capacity of the file system 1204. Further, the file system 1204, when active, consumes more power than does the cache 1206. The power consumption is often a concern when the media player 1200 is a portable media player that is powered by a battery (not shown). The media player 1200 also includes a RAM 1220 and a Read-Only Memory (ROM) 1222. The ROM 1222 can store programs, utilities or processes to be executed in a non-volatile manner. The RAM 1220 provides volatile data storage, such as for the cache 1206.

The media player 1200 also includes a user input device 1208 that allows a user of the media player 1200 to interact with the media player 1200. For example, the user input device 1208 can take a variety of forms, such as a button, keypad, dial, etc. Still further, the media player 1200 includes a display 1210 (screen display) that can be controlled by the processor 1202 to display information to the user. A data bus 1211 can facilitate data transfer between at least the file system 1204, the cache 1206, the processor 1202, and the CODEC 1212.

In one embodiment, the media player 1200 serves to store a plurality of media items (e.g., songs) in the file system 1204. One or more of the media items can have associated supplementary audio data, which can be part of or separate from, the media items. When a user desires to have the media player play a particular media item, a list of available media items is displayed on the display 1210. Then, using the user input device 1208, a user can select one of the available media items. The processor 1202, upon receiving a selection of a particular media item, supplies the media data (e.g., audio file) and any supplementary audio data for the particular media item to a coder/decoder (CODEC) 1212. The CODEC 1212 then produces analog output signals for a speaker 1214. The speaker 1214 can be a speaker internal to the media player 1200 or external to the media player 1200. For example, headphones or earphones that connect to the media player 1200 would be considered an external speaker.

The media player 1200 also includes a network/bus interface 1216 that couples to a data link 1218. The data link 1218 allows the media player 1200 to couple to a host computer. The data link 1218 can be provided over a wired connection or a wireless connection. In the case of a wireless connection, the network/bus interface 1216 can include a wireless transceiver.

The media items (or media assets) can be audio items (e.g., audio files or songs), videos (e.g., movies) or images (e.g., photos).

In one embodiment, the client device/media player is a portable media device dedicated to processing media such as audio, video and/or images. For example, the media device can be a music player (e.g., MP3 player), a game player, a video player, a video recorder, a camera, an image viewer and the like. These devices are generally battery operated and highly portable so as to allow a user to listen to music, play games, record video, play video, take pictures or view pictures wherever the user travels. In one implementation, the media device is a hand-held device that is sized for placement into a pocket or hand of the user. By being hand-held, the media device is relatively small and easily handled and utilized by its user. By being pocket sized, the user does not have to directly carry the media device and therefore the media device can be taken almost anywhere the user travels. Furthermore, the media device may be operated by the user's hands without the need for a reference surface such as a desktop.

In general, the media player can correspond to one or more of: a music player, game player, video player, camera, mobile telephone (e.g., cell phone), personal digital assistant (PDA), and/or the like.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that supplementary media can be output while playing a media item on a portable media device. Another advantage of the invention is that supplementary media provided and then associated with a media item. For example, supplementary audio (e.g., a personal message) can be added to an existing media item. Still another advantage of the invention is that speech synthesis can be can be used to generate supplementary audio, to provide a natural and professional-sounding rendition of the text or to produce certain desired voice characteristics. Yet still another advantage of the invention is that speech processing can enable supplementary audio to be mixed with media item audio in a natural and smooth manner.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for outputting media data to be played on a media output device, said method comprising:
   identifying media data for a media item to be played;
   determining whether supplementary media data is associated with the media item, wherein the supplementary media includes one or more of an audio message, a text message, a video message, an image message, or a combination thereof, and wherein the supplementary media data is associated with the media item when the media item is purchased;
   determining whether the supplementary media data includes a text message;
   converting the text message to an audio message format if it is determined that the supplementary media data includes a text message;
   mixing at least a portion of the supplementary media data with the identified media data to produce mixed media data; and
   outputting the mixed media data so as to concurrently output the identified media data together with at least the portion of the supplementary media data to the media output device.

2. A method as recited in claim 1, wherein said method further comprises:
   determining whether supplementary media data is enabled, and
   wherein said mixing is performed only if said determining determines that supplementary media data is enabled.

3. A method as recited in claim 1, wherein the media output device is one or more of a computer, a portable media device, or a stereo system.

4. A method as recited in claim 1, wherein supplementary media data can be enabled or disabled by a user setting.

5. A method as recited in claim 4, wherein the user setting is set through user interaction with the media output device.

6. A method as recited in claim 4, wherein said accessing and said mixing are performed only if said determining determines that supplementary media data is enabled.

7. A method as recited in claim 1, wherein the supplementary media data pertains to (i) a message, (ii) an annotation, (iii) a transition, or (iv) an attribute of the media item.

8. A method as recited in claim 1, wherein the media item pertains to a song, and wherein the supplementary media data provides title and/or artist information to a user of the media output device, thereby facilitating user navigation through various media items available to be played by the media output device.

9. A method as recited in claim 1, wherein the media item pertains to a song, a video, an audiobook, or a podcast.

10. A method as recited in claim 1, wherein the media output device is one or more of a computer, a portable media device, or a stereo system.

11. A method as recited in claim 1, wherein the media output device is a portable music player.

12. A method as recited in claim 1, further comprising:
    performing of the audio enhancement processing on the supplementary media data.

13. A method as recited in claim 12, wherein the performing of the audio enhancement processing serves to blend the supplementary media data with the identified media data.

14. A method as recited in claim 12, wherein the audio enhancement processing performs one or more of: sub-band compression, reverberation and equalization on the supplementary media data.

15. A method for outputting audio data to be played on a media output device, said method comprising:
    identifying audio data for a media item to be played;
    determining whether supplementary audio data is associated with the media item;
    accessing the supplementary audio data associated with the media item when said determining determines that supplementary audio data is associated with the media item, wherein the supplementary audio data is associated with the media item when the media item is purchased;
    performing audio enhancement processing on the supplementary audio data;
    mixing the supplementary audio data with the identified audio data; and
    outputting the mixed audio data so as to concurrently output the identified audio data together with at least the portion of the supplementary audio data to the media output device.

16. A method as recited in claim 15, wherein said method further comprises:
    determining whether supplementary audio data is enabled.

17. A method as recited in claim 16, wherein supplementary audio data can be enabled or disabled by a user setting.

18. A method as recited in claim 17, wherein the user setting is set through user interaction with the media output device.

19. A method as recited in claim 16, wherein said accessing and said mixing are performed only if said determining determines that supplementary audio data is enabled.

20. A method as recited in claim 15, wherein the supplementary audio data pertains to (i) a message, (ii) an annotation, (iii) a transition, or (iv) an attribute of the media item.

21. A method as recited in claim 15, wherein the media item pertains to a song, and wherein the supplementary audio data provides title and/or artist information to a user of the media output device, thereby facilitating user navigation through various media items available to be played by the media output device.

22. A method as recited in claim 15, wherein the media item pertains to a song, a video, an audiobook, or a podcast.

23. A method as recited in claim 15, wherein the media output device is one or more of a computer, a portable media device, or a stereo system.

24. A method as recited in claim 15, wherein the media output device is a portable music player.

25. A method as recited in claim 15, wherein said performing of the audio enhancement processing serves to blend the supplementary audio data with the identified audio data.

26. A method as recited in claim 15, wherein the audio enhancement processing performs one or more of: sub-band compression, reverberation and equalization on the supplementary media data.

27. A method for associating a media message to a media item, said method comprising:
    identifying, by a gift certificate recipient, a gift certificate having an associated media item of interest, the associated media item of interest having audio data;
    determining whether the media message is to be associated with the media item, wherein the media message includes one or more of an audio message, a text message, a video message, an image message, or a combination thereof;
    determining whether the media message includes a text message;
    converting the text message to an audio message format if it is determined that the media message includes a text message; and
    integrating the media message with the audio data of the media item,
    wherein the integrated media message and audio data were previously provided by a first user when purchasing the gift certificate for the gift certificate recipient.

28. A method as recited in claim 27, wherein said method comprises:
    delivering the media item along with the media message to a recipient.

29. A method as recited in claim 27, wherein said identifying is performed with respect with an online media store.

30. A method as recited in claim 27, wherein the media message is provided by a first user at a first personal computer, and
    wherein said method comprises:
        after associating the media message with the media item, delivering the media item along with the media message to a second user at a second personal computer.

31. A method as recited in claim 27, wherein the media message is provided by a first user when purchasing a gift certificate for the second user.

32. A method as recited in claim 31, wherein any media item purchased from an online media store using the gift certificate is associated with the media message.

33. A method as recited in claim 27, wherein the purchase of the gift certificate and the purchase of the media item are done via an online media store.

34. A method as recited in claim 27, wherein said method further comprises:
playing the media item;
retrieving the media message associated with the media item; and
playing the media message.

35. A method for associating personal media messages to media items, said method comprising:
receiving a request by a user to acquire a media item having audio data;
receiving a media message to be associated with the media item being acquired, wherein the media message includes one or more of an audio message, a text message, a video message, an image message, or a combination thereof;
determining whether the media message includes a text message;
converting the text message to an audio message format if it is determined that the media message includes a text message;
enhancing the media message, wherein the enhancing includes at least:
compressing the media message; and
equalizing the media message;
integrating the media message with the audio data into a single digital media file;
completing acquisition of the media item; and
forwarding the single digital media file for the acquired media item with the integrated associated media message and the audio data to the user or a third party.

36. A method as recited in claim 35, wherein the media item is acquired by being purchased.

37. A method as recited in claim 35, wherein the media item is acquired by being purchased from an online media store.

38. A method as recited in claim 35, wherein the personal media message is an audio message, a video message, or a text message.

39. A computer readable medium including at least executable computer program code tangibly stored thereon for outputting audio data to be played on a media output device, said computer readable medium comprising:
computer program code for identifying audio data for a media item to be played;
computer program code for determining whether supplementary audio data is associated with the media item, wherein the supplementary audio data is associated with the media item when the media item is purchased;
computer program code for accessing the supplementary audio data associated with the media item when said determining determines that supplementary audio data is associated with the media item;
computer program code for performing audio enhancement processing on the supplementary audio data;
computer program code for mixing the supplementary audio data with the identified audio data; and
computer program code for outputting the mixed audio data so as to concurrently output the identified audio data together with at least the portion of the supplementary audio data to the media output device.

40. A method for outputting audio data to be played on a media output device, said method comprising:
identifying media data for a media item to be played;
determining whether supplementary media data is associated with the media item;
accessing the supplementary media data associated with the media item when said determining determines that supplementary media data is associated with the media item, wherein the supplementary media data is associated with the media item when the media item is purchased;
determining whether supplementary media data is enabled, wherein supplementary media data can be enabled or disabled by a user setting;
performing media enhancement processing on the supplementary media data;
mixing the supplementary media data with the identified media data; and
outputting the mixed media data so as to concurrently output the identified media data together with at least the portion of the supplementary media data to the media output device,
wherein said accessing and said mixing are performed only if said determining determines that supplementary media data is enabled.

41. A method as recited in claim 40, wherein the user setting is set through user interaction with the media output device.

42. A method as recited in claim 40, wherein the supplementary media data pertains to (i) a message, (ii) an annotation, (iii) a transition, or (iv) an attribute of the media item.

43. A method as recited in claim 40, wherein the media item pertains to a song, and wherein the supplementary media data provides title and/or artist information to a user of the media output device, thereby facilitating user navigation through various media items available to be played by the media output device.

44. A method as recited in claim 40, wherein the media item pertains to a song, a video, an audiobook, or a podcast.

45. A method as recited in claim 40, wherein said performing of the audio enhancement processing serves to blend the supplementary media data with the identified media data.

* * * * *